(12) United States Patent
Chen et al.

(10) Patent No.: US 11,953,332 B2
(45) Date of Patent: Apr. 9, 2024

(54) TRANSPORTATION-BASED SERVICE SHARE SYSTEMS AND METHODS

(71) Applicant: Ford Global Technologies, LLC, Dearborn, MI (US)

(72) Inventors: Xingping Chen, Troy, MI (US); Jeremy Lerner, Southfield, MI (US); Danielle Rosenblatt, Madison Heights, MI (US); Scott Huggins, Novi, MI (US); Taylor Hawley, Oak Park, MI (US); Ali Abdallah, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 17/659,827

(22) Filed: Apr. 19, 2022

(65) Prior Publication Data
US 2023/0332905 A1    Oct. 19, 2023

(51) Int. Cl.
*G01C 21/34*    (2006.01)

(52) U.S. Cl.
CPC ..... *G01C 21/3438* (2013.01); *G01C 21/3461* (2013.01); *G01C 21/3492* (2013.01)

(58) Field of Classification Search
CPC ............ G01C 21/3438; G01C 21/3461; G01C 21/3492
See application file for complete search history.

(56) References Cited

U.S. PATENT DOCUMENTS

| | | | | |
|---|---|---|---|---|
| 10,152,053 | B1 * | 12/2018 | Smith | G05D 1/0027 |
| 11,586,999 | B2 * | 2/2023 | Masaba | H04L 67/12 |
| 2016/0110836 | A1 * | 4/2016 | Garg | G06Q 20/405 705/13 |
| 2018/0137470 | A1 * | 5/2018 | Donnelly | H04W 4/44 |
| 2018/0238694 | A1 * | 8/2018 | Bellotti | G01C 21/3438 |
| 2019/0020986 | A1 * | 1/2019 | Lee | G06Q 10/063 |
| 2020/0192385 | A1 * | 6/2020 | Fairfield | G05D 1/0088 |
| 2021/0172751 | A1 | 6/2021 | Balva | |
| 2021/0209517 | A1 * | 7/2021 | Shimodaira | G08G 1/202 |
| 2021/0223051 | A1 * | 7/2021 | Hochberg | G06V 20/593 |
| 2022/0004959 | A1 * | 1/2022 | Tang | G06N 20/00 |
| 2022/0221867 | A1 * | 7/2022 | Taveira | B60W 60/00253 |

FOREIGN PATENT DOCUMENTS

| | | |
|---|---|---|
| CN | 112529225 A | 3/2021 |
| KR | 20160029761 A | 3/2016 |

OTHER PUBLICATIONS

Kim; English Translation of KR20160029761A; Mar. 15, 2016; Espacenet (Year: 2016).*

Advantages of Hosting Corporate Meetings in Limos, Luxury Limousine, May 16, 2020.

* cited by examiner

*Primary Examiner* — Yazan A Soofi
*Assistant Examiner* — Naeem Taslim Alam
(74) *Attorney, Agent, or Firm* — Brandon Hicks; Eversheds Sutherland (US) LLP

(57) ABSTRACT

Transportation-based service share systems and methods are disclosed herein. An example method can include receiving a request from a service provider to reserve a ridehail vehicle for a ridehail having a time frame, the request specifying a service provided by the service provider; determining the ridehail vehicle for the service provider based on the service; and dispatching the ridehail vehicle, the service provider rendering the service during the ridehail.

20 Claims, 4 Drawing Sheets

TRANSPORTATION-BASED SERVICE SHARE SYSTEMS AND METHODS

BACKGROUND

Some businesses may have difficulty in reaching their target customers due to location and time constraints. For example, a person may want to learn a new language, but the tutors in their area may be unable to get to their home and the person may be unable to get to a centralized tutoring center. In another example, a doctor may want to treat patients in a home setting, especially when patients are immobile or unable to visit physician offices.

Further, riders in a ridehail service may find it difficult to efficiently utilize their time in the ridehail vehicle in a productive manner. That is, riders may not be able to leverage the time they have in ridehail services to perform services or engage in other productive activities.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
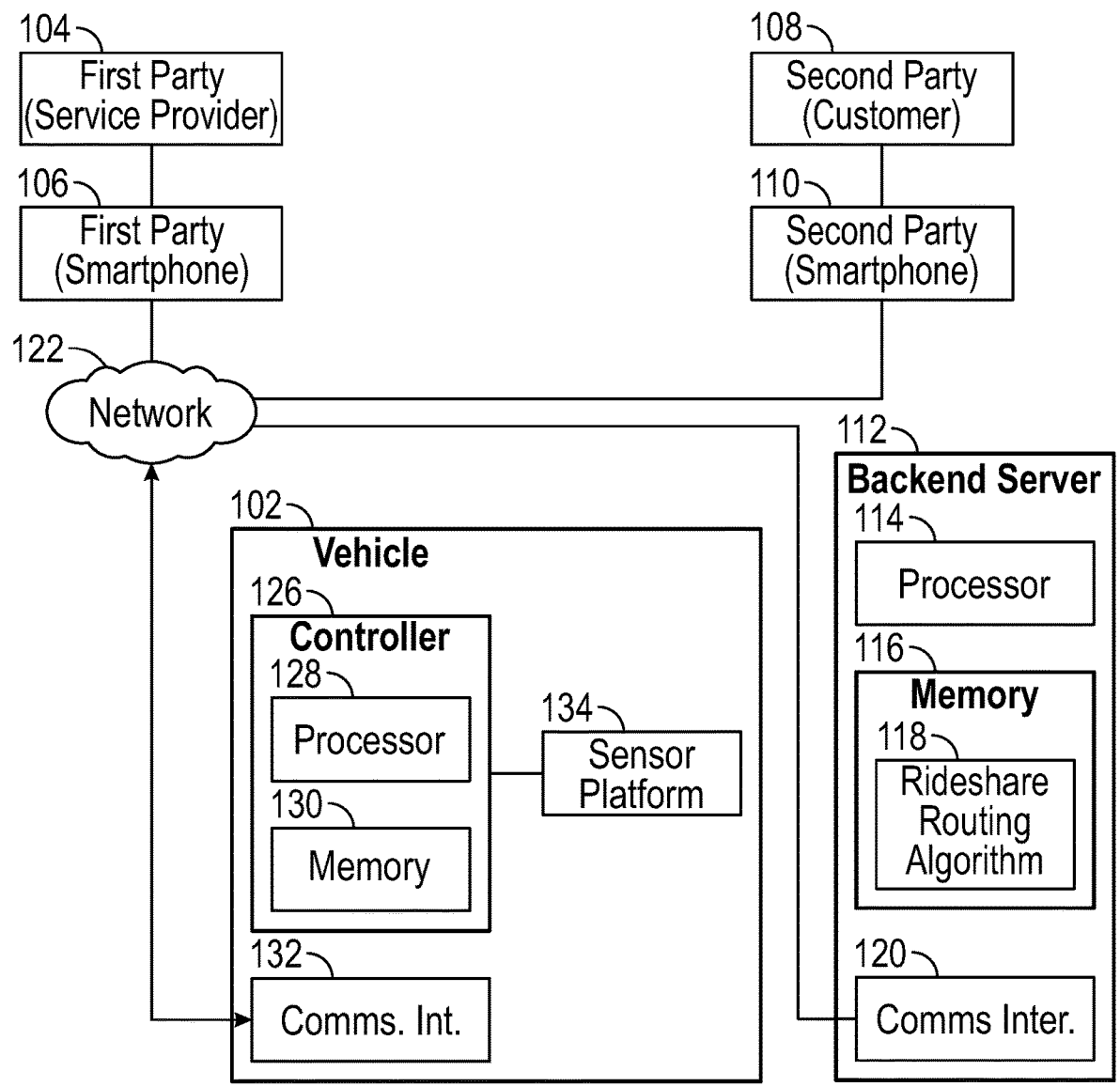
FIG. 1 illustrates an example environment in accordance with one or more embodiments of the disclosure.

The present disclosure pertains to specifically-configured ridehail vehicles that can be dispatched to certain types of businesses in an on-demand manner. A service provider can utilize a ridehail routing algorithm to prioritize a desired type of service to a rider when requested. The ridehail vehicle may be associated with a ridehail service (e.g., UBER, LYFT, or the like) and may include rideshare, ridehail, and ride-booking services. That is, the term ridehail may encompass herein rideshare, ridehail, and ride-booking vehicles, trips, and services.

In one example embodiment, a business owner can rent specific types of ridehail vehicles to match their business offering to certain time windows to better serve their customers. For example, a tutor could rent a ridehail vehicle as a mobile office for a certain time window (e.g., 4-6 pm) a few days in advance. Potential riders could book the ridehail during that time while seeking tutoring services (and/or be offered the tutoring service) for a planned fee based on ride duration.

In some instances, a business owner could pay a fee (or a percentage of revenue) to ridehail fleet owners to rent a ridehail vehicle as an office from which to provide services to ridehail riders. The ridehail riders could specify offerings they would like to be provided during their planned (or even on-demand) rides and vehicles with professionals offering those services could be prioritized for completing that trip (based on a multi-objective optimization, where the rider wait time would also need to be considered).

Riders could also be offered services when a vehicle with that service is the most appropriate ridehail vehicle to complete this rider's trip (can also utilize the route to get the vehicle closer to a more lucrative rider origin location). Business owners can offer a service for a time window conditionally, where their booking could be dependent on a specified number of riders booking their service during the time window, and matching the routing location needs. For example, the ridehail routing algorithm can determine when there are enough customers along a route path whose origin and destinations align to create a cohesive path.

The vehicles could be autonomous (where the professional is a passenger) or driven by a human driver where the human driver could provide some limited verbal services, or the professional could be another rider (where the driver is only driving the vehicle and not providing other services as well). Further, the professionals could specify a desired start and end location, if they would like to utilize the ridehail service offering time to also transport themselves to a desired final location.

Professionals could offer multiple types of services for potentially different rates (as well as rates differing between service providers). Riders could be presented with a base fare (cost of the ridehail transportation) as well as an increased cost of obtaining the service in the ridehail for various services and/or service providers. When all else is equal, a rider could choose a known service provider (or one with a high rating) or choose the cheapest service provider their route could accommodate.

Other professionals could offer services in ridehail vehicles as well. For example, a doctor could provide some services in a larger vehicle (such as a van) where a rider could be given a physical examination. Further, for delicate services that may require a very smooth ride (or even completely still), connected infrastructure and CV2X (connected vehicle to everything) technology can be utilized to determine the time vehicles may be stopped at traffic lights (or in heavy traffic) to allow the professional to gauge the amount of time they will have while the vehicle is still. In one example, the physician could be administering an injection and the vehicle could identify how long it is likely to be still at a stoplight.

Vehicles could optionally prioritize longer stops during stop-and-go traffic to allow for more stopped time to complete delicate services. Further, connected autonomous vehicles can inform nearby vehicles of upcoming actions that may result in a less smooth ride (such as braking, causing the vehicle behind to brake) or even of detected local road hazards (such as potholes) so that the professional providing delicate services can be informed of upcoming non-smooth ride time in advance.

A vehicle can serve as a mobile meeting room (e.g., with high-speed connectivity, teleconferencing ability, and/or a layout within the vehicle such as four seats facing each other with a table in the middle) and could be rented by companies to enable employees to join in on meetings while in a ridehail vehicle.

Illustrative Embodiments

Turning now to the drawings, FIG. 1 depicts an illustrative architecture 100 in which techniques and structures of the present disclosure may be implemented. The architecture 100 includes a vehicle 102 transporting a first party 104

(service provider) from a first location to provide a service to a second party 108 (customer) at a second location. In some examples, the purpose of the vehicle rental is to provide a location where a service can be rendered, regardless of the particular pickup or drop-off location of either or both of the first party 104 or the second party 108. In some instances, the route chosen for the vehicle can be based on picking up the service provider initially at the first location, picking up the customer at the second location, and then allowing the service provider to provide the service on a route back to dropping the service provider off at the first location. The customer could be routed back to the second location using the same or a different vehicle. For example, the customer could be routed back to the second location in a different vehicle that is headed in the direction of the second location. In another example, the customer could share a pool ride back to the second location along with a different service provider who is traveling to pick up a different customer.

In general, the vehicle 102 can include a legacy (human-operated vehicle) or an autonomous vehicle. The ridehail schedule of the vehicle 102 can be controlled by a backend server 112. Each of the first part 104 and the second party 108 can utilize mobile devices, such as Smartphones 106 and 110 to request use of the vehicle 102. Each of these mobile devices can execute ridehail professional services application that allows users to interact with the backend server 112. For example, service providers can list their services and request trips. Customers can select services and trips as well.

In general, the backend server 112 comprises a processor 114 and a memory 116 for storing executable instructions. For example, the memory 116 can store instructions such as a ridehail routing algorithm 118. When referring to operations of the backend server 112, this will be understood to include the processor executing instructions, such as the ridehail routing algorithm 118. The backend server 112 can include a communications interface 120 to transmit and/or receive data over a network 124.

In general, components of the architecture can communicate over a network 124. The network 124 can include combinations of networks. For example, the network 124 may include any one or a combination of multiple different types of networks, such as cellular, cable, the Internet, wireless networks, and other private and/or public networks. The network 124 can include either or both short and long-range wireless networks.

In some examples, the first party 104 could include a physician who makes house calls to patients. The second party 108 could be a patient of the first party 104. The first party 104 can request the vehicle 102 through the backend server 112 using their mobile device. The first party 104 can book a time slot with the backend server 112 to reserve the vehicle 102. The first party 104 can book a block of days and time in advance or a single trip on an ad-hoc basis. Similarly, the second party 108 could request the provision of a service from the backend server 112 to be matched with a service provider. In one example, a second party 108 could book music lessons with a music teacher. The lessons could take place in a vehicle 102 that is adapted with enough room or amenities to allow for the service. The student may desire to book the musician teacher for periodic appointments.

The backend server 112 can select and route a vehicle based on attributes. For example, a vehicle chosen for a given route/booking can be based on vehicle availability (could be proximity to either or both of the service provider or customer), service type, party preference (either service provider or customer), or any other variables as disclosed herein. The backend server 112 can select a vehicle based on local availability of vehicles.

In addition to routing by the backend server 112, the vehicle 102 can also utilize service-based parameters to pre-plan or dynamically adjust a route or booking. The vehicle 102 can comprise a controller 126 that comprises a processor 128 and a memory 130 for storing executable instructions. For example, the memory 130 can store instructions for pre-planning or dynamically adjusting a route or booking. When referring to operations of the controller 126, this will be understood to include the processor executing instructions. The vehicle 102 can include a communications interface 132 to transmit and/or receive data over a network 122. In some configurations, the controller 126 can utilize connected-vehicle-to-everything (CV2X) protocols to communicate with other connected vehicles and/or infrastructure to obtain real-time or near-real-time data for planning or adjusting a booking.

By way of example, the controller 126 can be configured to obtain data during a route to enable the provision of a service. For example, a doctor has booked a van to conduct a multi-stop vaccination through the backend server 112. In this example, the backend server 112 can book multiple back-to-back trips for the doctor with several patients. The backend server 112 transmits the trip request and service details to the vehicle 102. During the provision of the trip, the controller 126 determines that the ride should be relatively smooth or stationary to allow the doctor to perform their service. That is, the ridehail request can identify not only the service but also service parameters of the service, such as whether smooth or stationary vehicle behaviors are preferred. As discussed herein, vehicle operating conditions can be determined in real-time or near-real-time and used to alert a service provider or customer that a delicate service should be suspended for a period of time or entirely. Thus, the vehicle 102 may choose a path of travel that includes long stationary pauses such as heavy traffic, extended streetlight length, or on-street parking opportunities.

In some instances, the vehicle 102 can comprise a sensor platform 134 that can include camera(s), LiDAR, ultrasonic sensors, accelerometers, and so forth. These sensors can output data that is used by the controller 126 to determine ride smoothness and/or identify road conditions. For example, when a smooth (e.g., bump-free) ride has been requested due to the inherent nature of the service, the controller 126 can detect road conditions using camera(s) to detect potholes or other road obstructions. The controller 126 can also use output from accelerometers or other similar sensors that can measure vehicle displacement in one or more axes to detect deflection, yaw, lateral movement, and the like, as well as rates of change to these variables.

Figure 2:
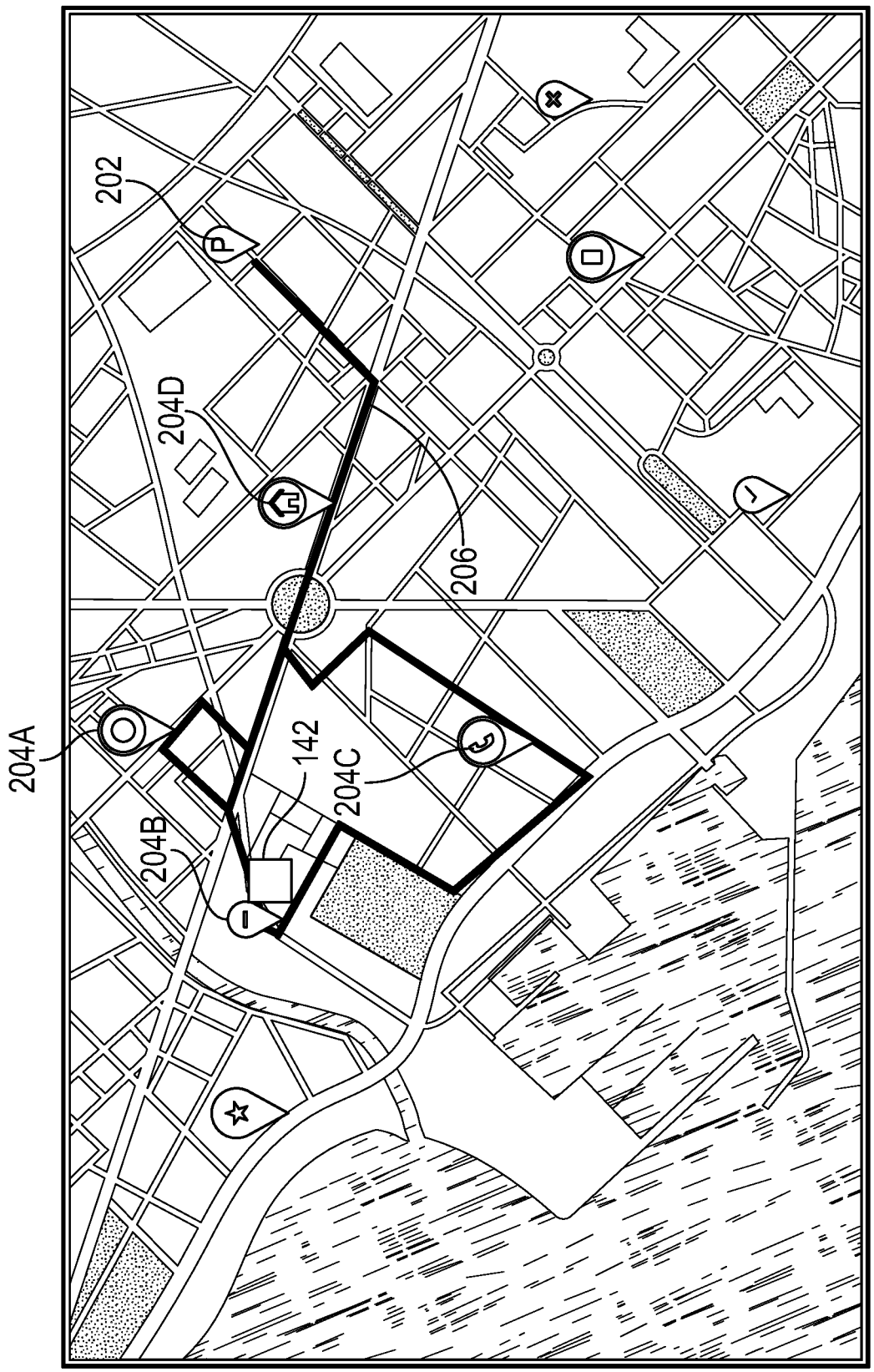
FIG. 2 is a perspective view of an example transportation-based service share route in accordance with one or more embodiments of the disclosure.

Referring now to FIGS. 1 and 2 collectively, which illustrates an example use case. In this example a physician has requested to rent the vehicle 102 for a period of time in order to make scheduled stops for visiting patients. The physician can specify their preferred route of travel based on patient locations 202A-202D and a pickup location 204 for the physician. In the current plan, the vehicle visits patient locations 202A-202D in order, ending on patient location 202D which is nearest the pickup location 204. The backend server 112 constructs a path 206 based on the patient locations 202A-202D and the pickup location 204.

Each of these patients is notified that the physician will be making a stop at or near their location. The patients can select one or more services provided by the physician. Based on their selections, the backend server 112 can construct a route for the vehicle and determine a charge for renting the vehicle for the physician. The physician can choose or accept or decline the charge based on how many services have been selected by the patients. If accepted, the vehicle can be dispatched to pick up the physician at a specified time. In general, the backend server 112 can transmit a notification to a customer of the service provider, receiving a selection of the service from the customer, and booking the service.

The vehicle drives a predetermined route to each patient. The length of time required for each stop can be based on the number and/or type of service(s) selected. In some instances, the patient can get in the vehicle and drive with the physician to another location. In other instances, the vehicle can remain stationary while the service is being performed, preferably if there is reservable or free parking.

In some instances, during running the route, the vehicle 102 can obtain information from intelligent traffic lights, parking meters, or other vehicles that may indicate opportunities for the vehicle to remain stationary. Using the example above, the vehicle 102 could identify locations where the vehicle is likely to remain idle for several minutes. Rather than the customer riding in the vehicle, the customer could meet at specified locations along a route where the vehicle is likely to sit idle, or where the vehicle can easily park for a period of time. The customer can show up at one of these locations to obtain their medical service. Real-time updates to vehicle position and stop locations can vary according to factors such as traffic. In some instances, the vehicle can output audible messages that indicate how much time remains until the vehicle is scheduled to depart to the next location. The physician can override departure if the current service is running longer than expected. The backend server 112 can update the schedule when overruns occur and inform downstream customers that their appointment may be delayed. That is, the backend server 112 can inform downstream customers of a potential delay. For example, a message may be transmitted to the mobile devices of customers who are scheduled for the service.

Figure 3:
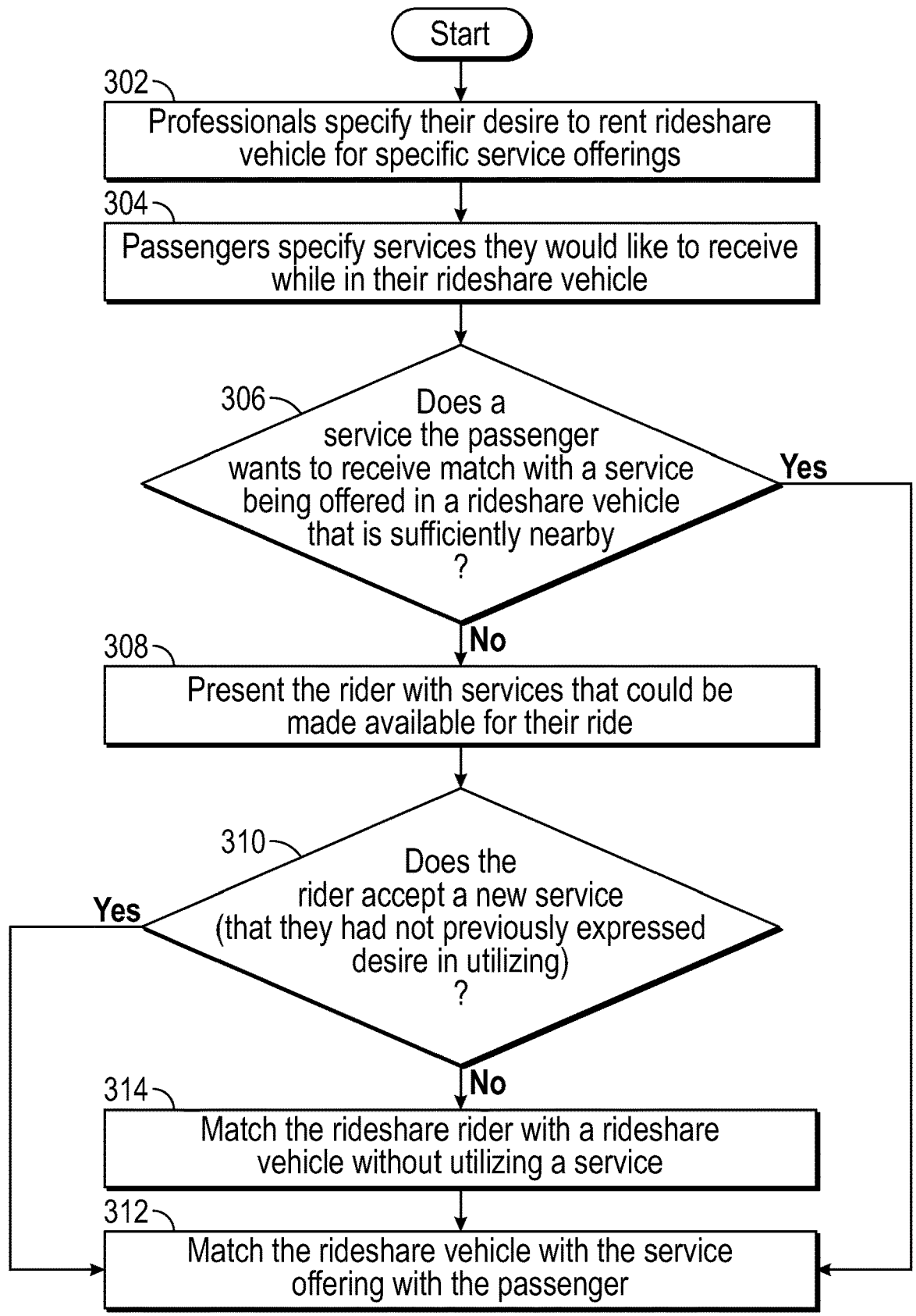
FIG. 3 is a flowchart of an example method in accordance with one or more embodiments of the disclosure.

FIG. 3 is a flowchart of an example method of the present disclosure. The method can initiate with a step 302 where a professional specifies their desire to reserve a ridehail vehicle for specific service offering(s). For example, a doctor requests a ridehail vehicle for making a house call to a patient. In step 304, passengers can specify services they would like to receive while in their ridehail vehicle. For example, the passenger/customer can select one or more medical treatments or services. To be sure, both individuals, the service provider and the customer are interacting with a backend server using a mobile device with a ridehail professional services application.

In step 306, a determination can be made as to whether the service the passenger wants to receive matches with a service being offered in a ridehail vehicle that is sufficiently nearby. That is, the backend server or vehicle can be configured to determine if the passenger is too far away. The determination can be made using parameters such as distance from the vehicle to passenger relative to trip time requested, traffic (could be determined from real-time traffic information or historical data), and other similar data. A location or distance threshold can be maintained. When the passenger and vehicle have a distance from one another that is within the threshold, the vehicle can be selected. When the passenger and vehicle have a distance from one another that is outside the threshold, the vehicle is listed as unavailable. In these instances, another vehicle may be dispatched that is closer to the passenger, if available.

If the vehicle is too far away, the method can include a step 308 to present the rider with services that could be made available for their ride. Again, another alternative is to identify another vehicle that may be closer and that also provides the same or similar service. In step 310, a determination is made as to whether the passenger has accepted a new proposed service. If the user does not want to accept this new proposed service, the method can include a step 312 that matches the passenger with a ridehail vehicle without utilizing the service. In step 314, if the vehicle is not too far away, the ridehail vehicle matches the service offering with the passenger.

Figure 4:
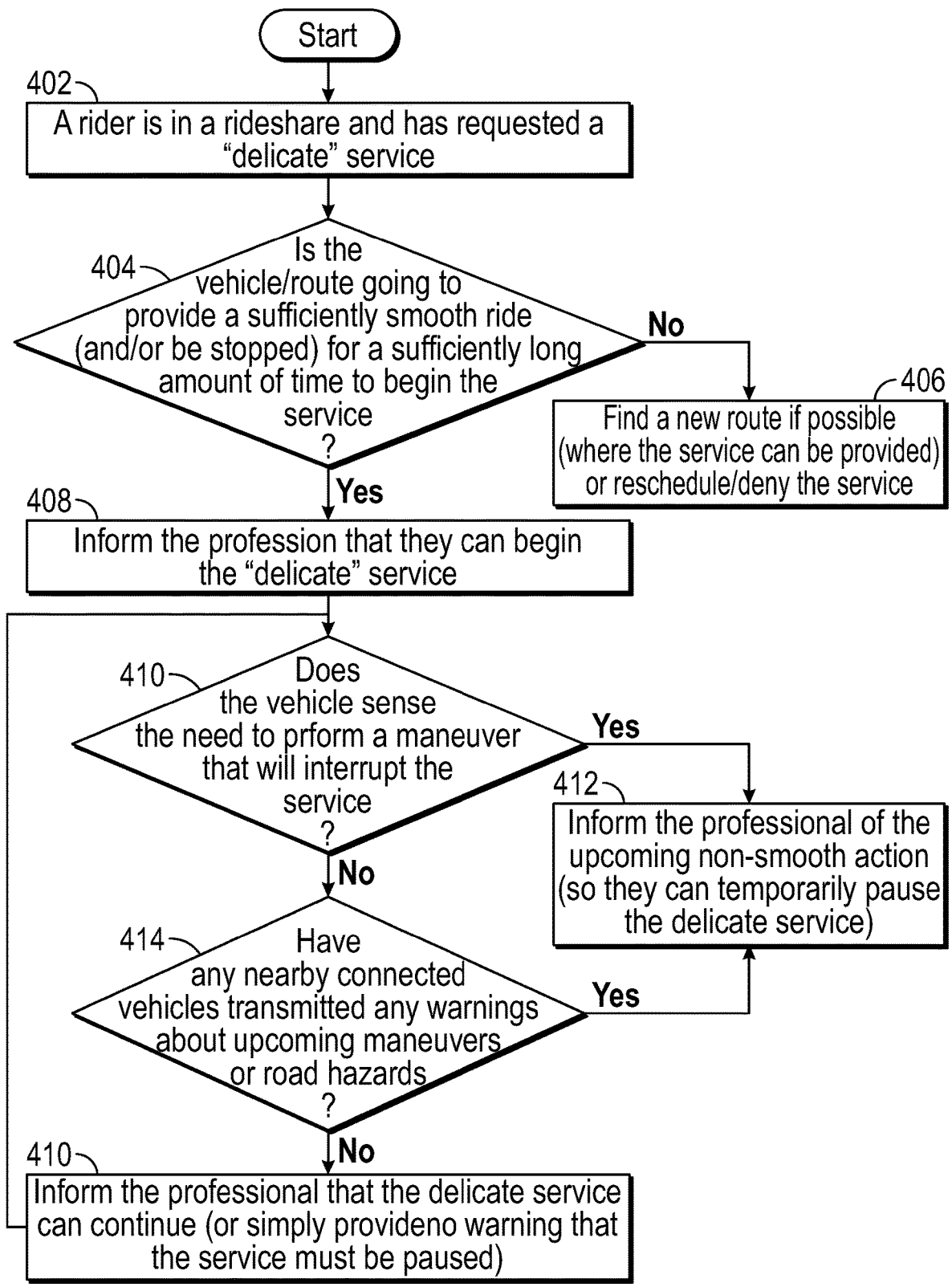
FIG. 4 is a flowchart of an example method in accordance with one or more embodiments of the disclosure.

FIG. 4 is a flowchart of another example method of the present disclosure. The method can include a step 402 where a rider is in a ridehail and has requested a "delicate" service. In step 404, a determination is made as to whether the vehicle/route will provide a sufficiently smooth ride (and/or be stopped) for a sufficiently long amount of time to begin and/or complete the service. This determination can be made based on knowing what service has been offered and the expected duration of such service.

In step 406, if the vehicle or route is unacceptable, the vehicle and/or backend server can determine a new route if possible (where the service can be provided) or reschedule/deny the service. However, if the vehicle or route is acceptable, the method includes a step 408 of informing the service provider that they can begin the "delicate" service. For example, an audible announcement can be made through the vehicle sound system. Alternatively, a message can be routed to the mobile device of the service provider. In step 410, the method can include determining when the vehicle senses a need to perform a maneuver that may interrupt the service. As noted above, this can include using camera images to identify poor road conditions or stop and go traffic. If a maneuver may interrupt the service, the method can include a step 412 of informing the service provider of the upcoming non-smooth action (so they can temporarily pause the delicate service). In step 414, if no specific maneuvers or changes in road conditions are detected, the method can include determining if any nearby connected vehicles have transmitted any alerts about upcoming maneuvers or road hazards. In addition to communications received from other connected vehicles, hazards or changes in road conditions can be received over the air through a navigation system of the vehicle or over CV2X from an infrastructure device or system. It will be understood that steps 404-414 can be executed in a continuous process while the ridehail trip is happening.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically/physically connected. The terms "couple" and "coupling" are also used in a non-mechanical/physical context that refers to absorption of microwave energy by a material. It is further noted that various figures (including component diagrams) shown and discussed herein are for illustrative purpose only, and are not drawn to scale. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
    receiving, by a ridehail service provider, a request from a service provider to reserve a ridehail vehicle for a ridehail service having a time frame, the request specifying a business service provided by the service provider, wherein the ridehail service provider and the ridehail service are each different from a corresponding one of the service provider and the business service;
    charging a customer a first rate for the ridehail service and a second, additional rate for the business service;
    determining, by the ridehail service provider, the ridehail vehicle for the service provider based on the business service; and
    dispatching, by the ridehail service provider, the ridehail vehicle in order for the ridehail service to be provided to the customer, the service provider rendering the business service to the customer during the ridehail service.

2. The method according to claim 1, further comprising determining service parameters that are used to select the ridehail vehicle for the business service, and responsive to the customer communicating with the service provider, renting, by the service provider, the ridehail vehicle during a predetermined time window at least one day a week, so that the business service can be provided to the customer during the predetermined time window.

3. The method according to claim 1, further comprising providing with the service provider a medical service personnel, and determining when the business service is a delicate service that requires the ridehail vehicle to be stationary for a portion of the ridehail so that the medical service personnel can provide medical treatment to the customer.

4. The method according to claim 3, further comprising:
    obtaining, during the ridehail service, output from a vehicle sensor platform that is of changes in road conditions or driving conditions; and
    outputting alerts to the service provider or the customer that the delicate service should be suspended for a period of time or entirely based on the changes in the road conditions or the driving conditions.

5. The method according to claim 1, further comprising determining changes in road conditions or driving conditions from other vehicles or infrastructure over a wireless network, and providing with the service provider a professional offering predetermined services, and wherein dispatching, by the ridehail service provider, the ridehail vehicle is performed in an on-demand manner based on at least one specification of the customer corresponding to the predetermined services offered by the professional.

6. The method according to claim 1, further comprising:
    transmitting a notification to the customer of the service provider;
    receiving a selection of the business service from the customer; and
    booking the business service,
    wherein the customer is a first customer,
    wherein receiving, by the ridehail service provider, the request from the service provider to reserve a ridehail vehicle is conditioned in part on a number of customers, including the first customer, booking the business service during a predetermined time window.

7. The method according to claim 1, further comprising selecting the service provider for the business service from a list of a plurality of service providers based on a rating of the service provider as compared to ratings of other of the plurality of service providers.

8. A method comprising:
    receiving, by a ridehail service provider, a first request from a service provider to reserve a ridehail vehicle for a ridehail service having a time frame, the first request specifying businesses services offered by the service provider, wherein the ridehail service provider and the ridehail service are each different from a corresponding one of the service provider and the business services;

charging a customer a first rate for the ridehail service and a second, additional rate for the business services;

receiving, by the ridehail service provider, a second request from the customer, the second request identifying business services desired by the customer during the ridehail service;

determining, by the ridehail service provider, a match between the business services offered by the service provider and the business services desired by the customer; and dispatching, by the ridehail service provider, the ridehail vehicle for the service provider and the customer based on the match in order for the business services to be provided to the customer during the ridehail service.

9. The method according to claim 8, further comprising dispatching a different ridehail vehicle when the match does not exist.

10. The method according to claim 8, further comprising allowing the customer to select one of the services offered by the service provider when the match does not exist.

11. The method according to claim 8, further comprising determining service parameters that are used to select the ridehail vehicle.

12. The method according to claim 8, further comprising determining when the services are delicate services that require the ridehail vehicle to be stationary for a portion of the ridehail.

13. The method according to claim 12, further comprising:

obtaining, during the ridehail, output from a vehicle sensor platform that is of changes in road conditions or driving conditions; and outputting alerts to the service provider or the customer that the delicate services should be suspended for a period of time or entirely based on the changes in the road conditions or the driving conditions.

14. The method according to claim 8, further comprising determining changes in road conditions or driving conditions from other vehicles or infrastructure over a wireless network.

15. A system comprising:

a memory for storing instructions; and a processor that executes the instructions to:

receive, by a ridehail service provider, a request from a service provider to reserve a ridehail vehicle for a ridehail service having a time frame, the request specifying a business service provided by the service provider, wherein the ridehail service provider and the ridehail service are each different from a corresponding one of the service provider and the business service;

charge a customer a first rate for the ridehail service and a second, additional rate for the business service;

determine, by the ridehail service provider, the ridehail vehicle for the service provider based on the business service; and dispatch, by the ridehail service provider, the ridehail vehicle in order for the ridehail service to be provided to the customer, the service provider rendering the business service to the customer during the ridehail service.

16. The system according to claim 15, wherein the processor is configured to determine service parameters that are used to select the ridehail vehicle for the service.

17. The system according to claim 16, wherein the processor is configured to determine when the service is a delicate service that requires the ridehail vehicle to be stationary for a portion of the ridehail.

18. The system according to claim 17, wherein the processor is configured to:

transmit a notification to the customer of the service provider that indicates the service;

receive a selection of the service from the customer; and book the service.

19. The system according to claim 18, wherein the processor is configured to prioritize a plurality of stops for the ridehail over the time frame, where a new customer is provided the service at each of the plurality of stops.

20. The system according to claim 19, wherein the processor is configured to:

generate a schedule for the plurality of stops;

update the schedule when overruns occur during the ridehail; and inform downstream customers of a potential delay.

* * * * *